(12) United States Patent
Gentle et al.

(10) Patent No.: US 7,881,450 B1
(45) Date of Patent: Feb. 1, 2011

(54) ANSWER ON HOLD NOTIFICATION

(75) Inventors: Christopher Reon Gentle, Gladesville (AU); Nivedita Mogale, Beaumont Hills (AU); Mei Sing Ong, Kingsford (AU); Julian Orbach, Macquarie Park (AU); Alastair John Rankine, Five Dock (AU)

(73) Assignee: Avaya Inc., Basking Ridge, NJ (US)

( * ) Notice: Subject to any disclaimer, the term of this patent is extended or adjusted under 35 U.S.C. 154(b) by 1027 days.

(21) Appl. No.: 11/228,646

(22) Filed: Sep. 15, 2005

(51) Int. Cl.
*H04M 3/42* (2006.01)

(52) U.S. Cl. .............................. 379/215.01; 379/211.03

(58) Field of Classification Search ................................ 379/201.01–215.01, 93.35, 215.02
See application file for complete search history.

(56) References Cited

U.S. PATENT DOCUMENTS

| | | |
|---|---|---|
| 4,163,124 A | 7/1979 | Jolissaint |
| 4,567,323 A | 1/1986 | Lottes et al. |
| 4,731,822 A | 3/1988 | Berry, III et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,983 A | 11/1992 | Brown et al. |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,291,550 A | 3/1994 | Levy et al. |
| 5,299,260 A | 3/1994 | Shaio |
| 5,309,513 A | 5/1994 | Rose |
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |
| 5,436,967 A | 7/1995 | Hanson |
| 5,444,774 A | 8/1995 | Friedes |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |

(Continued)

FOREIGN PATENT DOCUMENTS

CA 2143198 1/1995

(Continued)

OTHER PUBLICATIONS

GEOTEL Communications Corporation Web site printout entitled "Intelligent CallRouter", 1998.

(Continued)

*Primary Examiner*—Curtis Kuntz
*Assistant Examiner*—Mohammad Islam
(74) *Attorney, Agent, or Firm*—Sheridan Ross P.C.

(57) ABSTRACT

An answer on hold notification feature is provided. The answer on hold notification feature is activated when a call is waiting for servicing by a human agent. For example the feature may be activated when the call is placed on hold by the user of the first communication endpoint. By providing an answer on hold notification signal feature, a user can engage in a second call, or perform other tasks, without the risk of losing an opportunity to speak with a human agent as a result of attending to such other call or task.

16 Claims, 6 Drawing Sheets

U.S. PATENT DOCUMENTS

| | | | |
|---|---|---|---|
| 5,537,542 A | 7/1996 | Eilert et al. |
| 5,544,232 A | 8/1996 | Baker et al. |
| 5,546,452 A | 8/1996 | Andrews et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,724,092 A | 3/1998 | Davidsohn et al. |
| 5,740,238 A | 4/1998 | Flockhart et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,818,907 A | 10/1998 | Maloney et al. |
| 5,825,869 A | 10/1998 | Brooks et al. |
| 5,828,747 A | 10/1998 | Fisher et al. |
| 5,838,968 A | 11/1998 | Culbert |
| 5,839,117 A | 11/1998 | Cameron et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,915,012 A | 6/1999 | Miloslavsky |
| 5,926,538 A | 7/1999 | Deryugin et al. |
| 5,930,337 A | 7/1999 | Mohler |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,978,467 A | 11/1999 | Walker et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,038,293 A | 3/2000 | Mcnerney et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless |
| 6,088,441 A | 7/2000 | Flockhart et al. |
| 6,115,462 A | 9/2000 | Servi et al. |
| 6,122,346 A * | 9/2000 | Grossman ..................... 379/68 |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,208,729 B1 * | 3/2001 | Agraharam et al. .... 379/215.01 |
| 6,215,865 B1 | 4/2001 | McCalmont |
| 6,219,415 B1 * | 4/2001 | Deutsch et al. ........ 379/215.01 |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,292,550 B1 | 9/2001 | Burritt |
| 6,295,353 B1 | 9/2001 | Flockhart et al. |
| 6,353,810 B1 | 3/2002 | Petrushin |
| 6,356,632 B1 | 3/2002 | Foster et al. |
| 6,366,668 B1 | 4/2002 | Borst et al. |
| 6,389,028 B1 | 5/2002 | Bondarenko et al. |
| 6,389,132 B1 | 5/2002 | Price |
| 6,389,400 B1 | 5/2002 | Bushey et al. |
| 6,408,066 B1 | 6/2002 | Andruska et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,597,685 B2 | 7/2003 | Miloslavsky et al. |
| 6,614,903 B1 | 9/2003 | Flockhart et al. |
| 6,650,748 B1 | 11/2003 | Edwards et al. |
| 6,690,776 B1 * | 2/2004 | Raasch ..................... 379/93.35 |
| 6,697,457 B2 | 2/2004 | Petrushin |
| 6,704,409 B1 | 3/2004 | Dilip et al. |
| 6,707,903 B2 | 3/2004 | Burok et al. |
| 6,731,609 B1 | 5/2004 | Hirni et al. |
| 6,744,877 B1 | 6/2004 | Edwards |
| 6,754,333 B1 | 6/2004 | Flockhart et al. |
| 6,766,013 B2 | 7/2004 | Flockhart et al. |
| 6,766,014 B2 | 7/2004 | Flockhart et al. |

| | | | |
|---|---|---|---|
| 6,771,765 | B1 | 8/2004 | Crowther et al. |
| 6,876,632 | B1* | 4/2005 | Takeda .................... 370/259 |
| 6,947,543 | B2 | 9/2005 | Alvarado et al. |
| 7,035,808 | B1 | 4/2006 | Ford |
| 7,035,927 | B2 | 4/2006 | Flockhart et al. |
| 7,110,525 | B1 | 9/2006 | Heller et al. |
| 7,151,826 | B2 | 12/2006 | Shambaugh et al. |
| 7,200,219 | B1 | 4/2007 | Edwards et al. |
| 7,222,075 | B2 | 5/2007 | Petrushin |
| 7,260,205 | B1* | 8/2007 | Murphy et al. ......... 379/215.01 |
| 7,295,669 | B1 | 11/2007 | Denton et al. |
| 7,317,787 | B2 | 1/2008 | Crockett et al. |
| 7,386,115 | B2 | 6/2008 | Peters |
| 7,412,050 | B2* | 8/2008 | Renner et al. .......... 379/215.01 |
| 2003/0174830 | A1 | 9/2003 | Boyer et al. |
| 2003/0177017 | A1 | 9/2003 | Boyer et al. |
| 2004/0136515 | A1* | 7/2004 | Litwin, Jr. .............. 379/202.01 |
| 2004/0203878 | A1 | 10/2004 | Thomson |
| 2005/0071211 | A1 | 3/2005 | Flockhart et al. |
| 2005/0071212 | A1 | 3/2005 | Flockhart et al. |
| 2005/0071241 | A1 | 3/2005 | Flockhart et al. |
| 2005/0071844 | A1 | 3/2005 | Flockhart et al. |
| 2005/0129211 | A1 | 6/2005 | Gallagher et al. |
| 2006/0015388 | A1 | 1/2006 | Flockhart et al. |
| 2006/0147006 | A1 | 7/2006 | Gonen et al. |
| 2007/0003045 | A1* | 1/2007 | Florkey et al. ......... 379/215.01 |

FOREIGN PATENT DOCUMENTS

| | | |
|---|---|---|
| CA | 2174762 | 6/1995 |
| EP | 0 501 189 A2 | 9/1992 |
| EP | 0 740 450 A2 | 10/1996 |
| EP | 0 772 335 A2 | 5/1997 |
| EP | 0 855 826 A2 | 7/1998 |
| EP | 0 863 651 A2 | 9/1998 |
| EP | 0829996 A2 | 9/1998 |
| EP | 0866407 A1 | 9/1998 |
| EP | 899673 A2 | 3/1999 |
| EP | 998108 A1 | 5/2000 |
| EP | 1091307 A2 | 4/2001 |
| EP | 1150236 | 10/2001 |
| GB | 2 273 418 | 6/1994 |
| GB | 2 290 192 A | 12/1995 |
| WO | WO 96/07141 | 3/1996 |
| WO | WO 97/28635 | 8/1997 |
| WO | WO 98/56207 | 12/1998 |

OTHER PUBLICATIONS

U.S. Appl. No. 11/244,358, filed Oct. 4, 2005, Uba.

U.S. Appl. No. 11/198,824, filed Aug. 5, 2005, Uba et al.

"Product Features," Guide to Call Center Automation, Brock Control Systems, Inc., Activity Managers Series™,Section 5—Company B120, p. 59, 1992.

"Product Features," Guide to Call Center Automation, CRC Information Systems, Inc., Tel-ATHENA, Section 5—Company C520, p. 95, 1992.

Dawson, "NPRI's Powerguide, Software Overview" Call Center Magazine (Jun. 1993), p. 85.

"Applications, NPRI's Predictive Dialing Package," Computer Technology (Fall 1993), p. 86.

"Call Center Software You Can't Outgrow," Telemarketing® (Jul. 1993), p. 105.

"VAST™, Voicelink Application Software for Teleservicing®," System Manager User's Guide, Digital Systems (1994), pp. ii, vii-ix, 1-2, 2-41 through 2-77.

GEOTEL Communications Corporation Web site printout entitled "Intelligent CallRouter" Optimizing the Interaction Between Customers and Answering Resources. 6 pages.

L.F. Lamel and J.L. Gauvain, Language Identification Using Phone-Based Acoustic Likelihood, ICASSP-94, 4 pages.

John H.L. Hansen and Levent M. Arsian, Foreign Accent Classification Using Source Generator Based Prosodic Features, IEEE Proc. ICASSP, vol. 1, pp. 836-839, Detroit USA (May 1995).

Levent M. Arsian and John H.L. Hansen, Language Accent Classification in American English, Robust Speech Processing Laboratory Duke University Department of Electrical Engineering, Durham, NC, Technical Report RSPL-96-7, revised Jan. 29, 1996, pp. 1-16.

Levent M. Arsian, Foreign Accent Classification in American English, Department of Electrical Computer Engineering, Duke University, Thesis, pp. 1-200 (1996).

E. Noth et al., "Research Issues for the Next Generation Spoken": University of Erlangen-Nuremberg, Bavarian Research Centre for Knowledge-Based Systems, at http://www5.informatik.uni-erlangen.de/literature.psdir/1999/Noeth99:RIF.ps.gz 8 pages.

Presentation by Victor Zue, The MIT Ox90ygen Project, MIT Laboratory for Computer Science (Apr. 25-26, 2000) 9 pages.

MIT Project Oxygen, Pervasive, Human-Centered Computing (MIT Laboratory for Computer Science) (Jun. 2000) pp. 1-15.

Examiner's Refusal Decision date Jul. 4, 2005 in Japanese Patent App. No. 2000-34266.

Examiner's Refusal Decision for Japanese Patent Application No. 2000-34267 dated Mar. 9, 2005 with translation 4 pages.

Avaya, Inc. Business Advocate Product Summary, at http://www.avaya.com, downloaded on Feb. 15, 2003, Avaya, Inc. 2003, 3 pages.

Avaya, Inc. Business Advocate Options, at http://www.avaya.com, downloaded on Feb. 15, 2003, Avaya, Inc. 2003.

Avaya, Inc. CentreVu Advocate, Release 9, User Guide, Dec. 2000.

"Internet Protocol Addressing," available at http://samspade.org/d/ipdns.html, downloaded Mar. 31, 2003, 9 pages.

"Domain Name Services," available at http://www.pism.com/chapt09/chapt09.html, downloaded Mar. 31, 2003, 21 pages.

Bellsouth Corp., "Frequently Asked Questions—What is a registrar?," available at https://registration.bellsouth.net/ NASApp/DNSWebUI/FAQ.jsp, downloaded Mar. 31, 2003, 4 pages.

Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.

Coles, Scott, "A Guide for Ensuring Service Quality in IP Voice Networks," Avaya, Inc., 2002, pp. 1-17.

Avaya, Inc., "The Advantages of Load Balancing in the Multi-Call Center Enterprise," Avaya, Inc., 2002, 14 pages.

Foster, Robin, et al., "Avaya Business Advocate and its Relationship to Multi-Site Load Balancing Applications," Avaya, Inc., Mar. 2002, 14 pages.

Chavez, David, et al., "Avaya MultiVantage Software: Adapting Proven Call Processing for the Transition to Converged IP Networks," Avaya, Inc., Aug. 2002.

Avaya, Inc., "Voice Over IP Via Virtual Private Networks: An Overview," Avaya, Inc., Feb. 2001, 9 pages.

Avaya, Inc., "Better Implementation of IP in Large Networks," Avaya, Inc. 2002, 14 pages.

Stevenson et al.; "Name Resolution in Network and Systems Management Environments"; http://netman.cit.buffalo.edu/Doc/DStevenson/NR-NMSE.html; 16 pages.

Doo-Hyun Kim et al. "Collaborative Multimedia Middleware Architecture and Advanced Internet Call Center," Proceedings at the International Conference on Information Networking (Jan. 31, 2001), pp. 246-250.

"When Talk Isn't Cheap," Sm@rt Reseller, v. 3, n. 13 (Apr. 3, 2000), p. 50.

"eGain's Commerce 2000 Platform Sets New Standard for eCommerce Customer Communications," Business Wire (Nov. 15, 1999), 3 pages.

* cited by examiner

ANSWER ON HOLD NOTIFICATION

FIELD

The present invention is related to providing an answer on hold notification. In particular, the present invention is related to notifying the user of a communication device that information is available on a communication channel that the user has placed on hold.

BACKGROUND

Telephony devices are a convenient means for providing information and product support to consumers. However, it is common for consumers seeking information or support to be placed on hold while their call is waiting in a queue to talk to a customer support representative. While on hold, a user of a telephony device may receive an incoming call on another line. As a result, a user of a communication device that supports call waiting and/or multiple lines is faced with the dilemma of answering the incoming call or letting it go to cover. If the incoming call is answered, the call that was placed on hold may be answered by a customer service representative while the user handles the incoming call. The customer service representative will presumably hang up if they do not receive a response from the user.

This scenario is illustrated in FIG. 1, which presents an example in which a user 100 has established a communication channel 104 with a customer service center 108. As illustrated, upon establishing the communication channel 104, the user 100 receives a response from an interactive voice response (IVR) system 112. The IVR system 112 may provide an indication to the user 100 that the user's call is being placed on hold.

Meanwhile, a third party 116 may telephone the user 100, establishing a second communication channel 120 between the communication device of the third party 116 and the communication device of the user 100. In response to a ring or other indication that the third party 116 seeks to establish a second communication channel 120, the user 100 may place the first call on hold 124 and answer the incoming call 128.

After the user has answered the call from the third party, a customer service representative 132 associated with the service center 108 may provide a greeting 136 to the user 100 on the first communication channel 104 and seek to engage in communications with the user 100. Because in the example scenario the user 100 has engaged the third party 116 on a second communication channel 120, the customer service representative 132 will receive no response. Furthermore, the user 100 will receive no indication that the customer service representative 132 is now available. Receiving no response from the user 100, the customer service representative 132 will disconnect 140 in order to handle a call from another user or to perform other tasks.

After the user 100 and third party 116 have completed their conversation and disconnected 144, the user 100 may check on the status of the call placed to the customer service center 108. Upon taking the first communication channel 104 off of hold 148, user 100 will discover that the customer service center 108 has disconnected. Accordingly, the user 100 must place another call to the customer service center 108 and presumably start from the back of the queue of users waiting for a customer service representative 132.

In order to address potentially long wait times, customer relationship management (CRM) systems have been developed that allow the user to enter their telephone number, so that the CRM system can call the user back when a customer service representative is available. However, this feature is not widely supported. In addition, it requires the service organization to incur the cost of a callback service.

A user can also address the situation by conferencing an incoming call into the original call to the customer service center. However, this can be distracting, as CRM systems often play music or announcements to callers placed on hold, which would interfere with a conversation between the user and the third party. In addition, the user may not want information that may be provided from the customer service center to be heard by the third party caller.

Although a user can monitor the communication channel through a speaker phone to determine whether a customer service representative is available, this merely allows the user to put the handset down. However, it does not provide any notification of the availability of a customer service representative if the user has answered an incoming call while a call to the CRM system is on hold. Also, monitoring a call requires that the user listen closely enough to determine whether a customer service representative has answered the call.

SUMMARY

The present invention is directed to solving these and other problems and disadvantages of the prior art. In accordance with embodiments of the present invention, a notification of an answer or other indication of the availability of a customer service representative or other party on a communication channel that was previously placed on hold is provided. Furthermore, such notification can, in accordance with embodiments of the present invention, be provided while a user is engaged in a conversation on a second communication channel. Still other embodiments of the present invention provide notification of a communication channel being answered or being taken off hold, without requiring the user waiting for service to personally monitor the audio feed on that communication channel. Instead, notification may be provided through a signal that is separate from the information comprising the audio feed.

In accordance with embodiments of the present invention, an answer on hold signal comprises a visible or audible signal generated in response to information received over a communication channel. Such information may comprise a human voice that is detected by a voice activity detector.

Additional features and advantages of embodiments of the present invention will become more readily apparent from the following description, particularly when taken together with the accompanying drawings.

DETAILED DESCRIPTION

The present invention is generally directed to providing an answer on hold notification. In particular, notification that a party on a first communication channel is available for communication with a user is provided while that communication channel is on hold. Furthermore, an answer on hold notification can be provided to the user while the user is engaged in another call.

Figure 1:
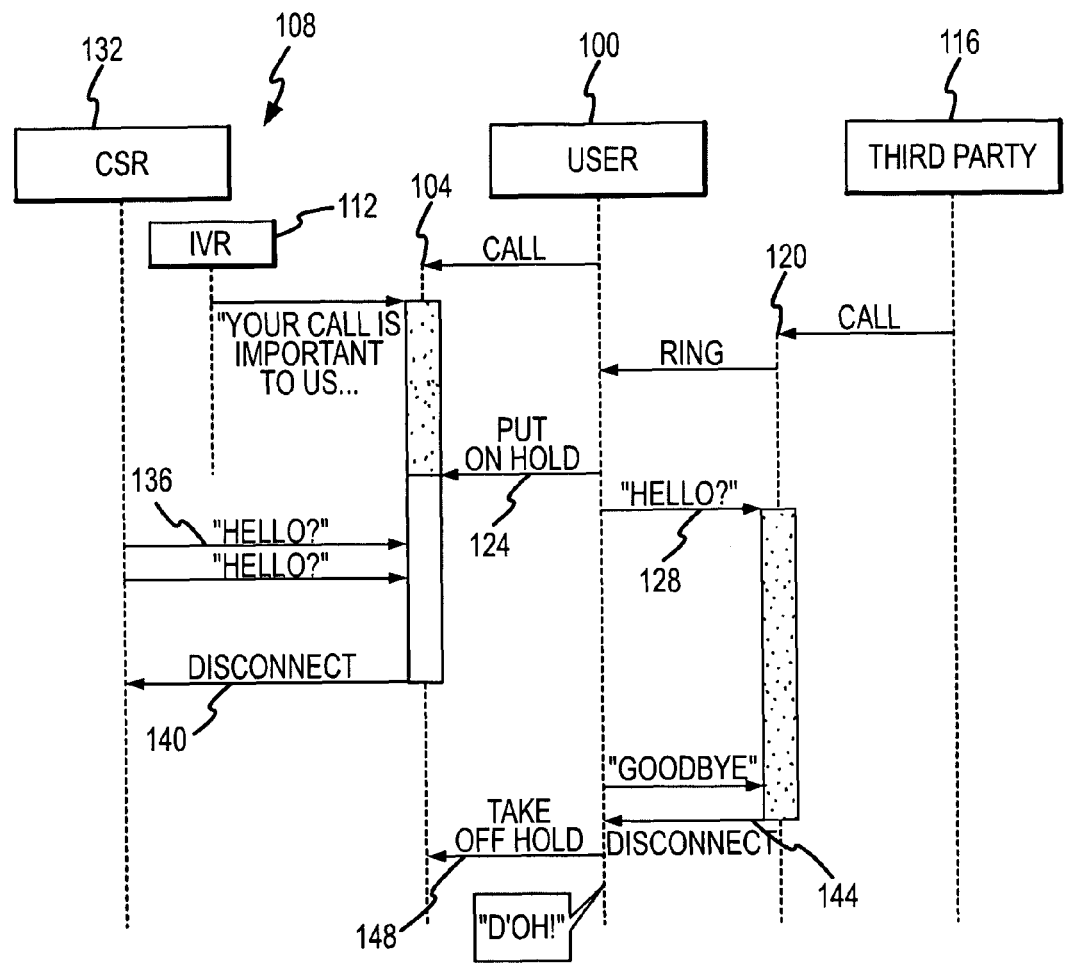
FIG. 1. depicts a scenario according to the prior art in which a call placed on hold is answered while another call is in progress.
Figure 2:
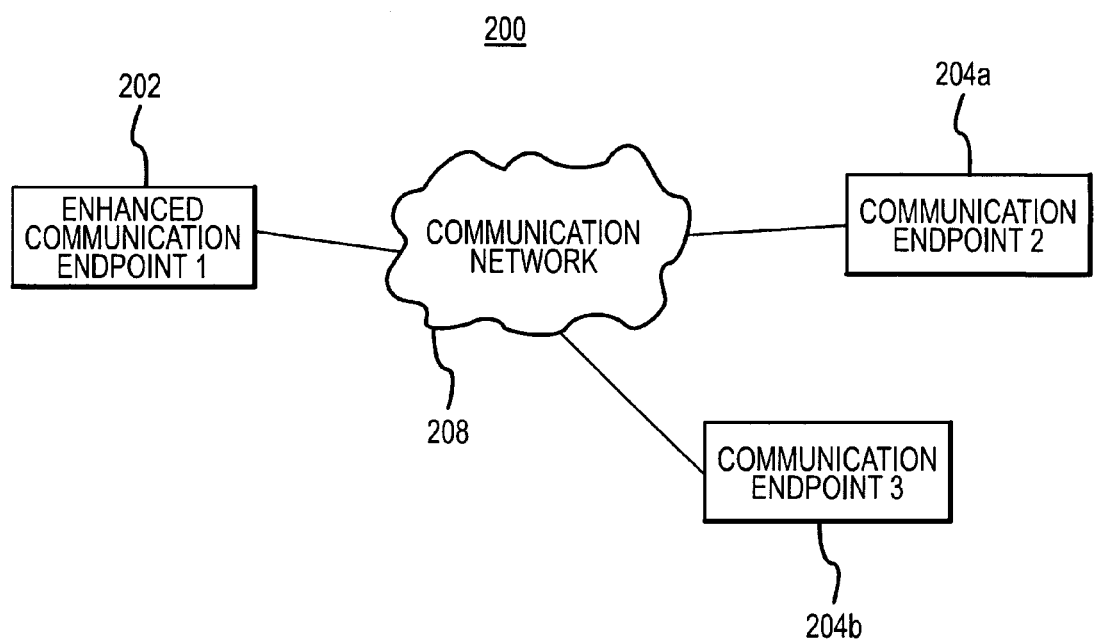
FIG. 2 is a block diagram depicting a communication system with answer on hold features in accordance with embodiments of the present invention.
Figure 3:
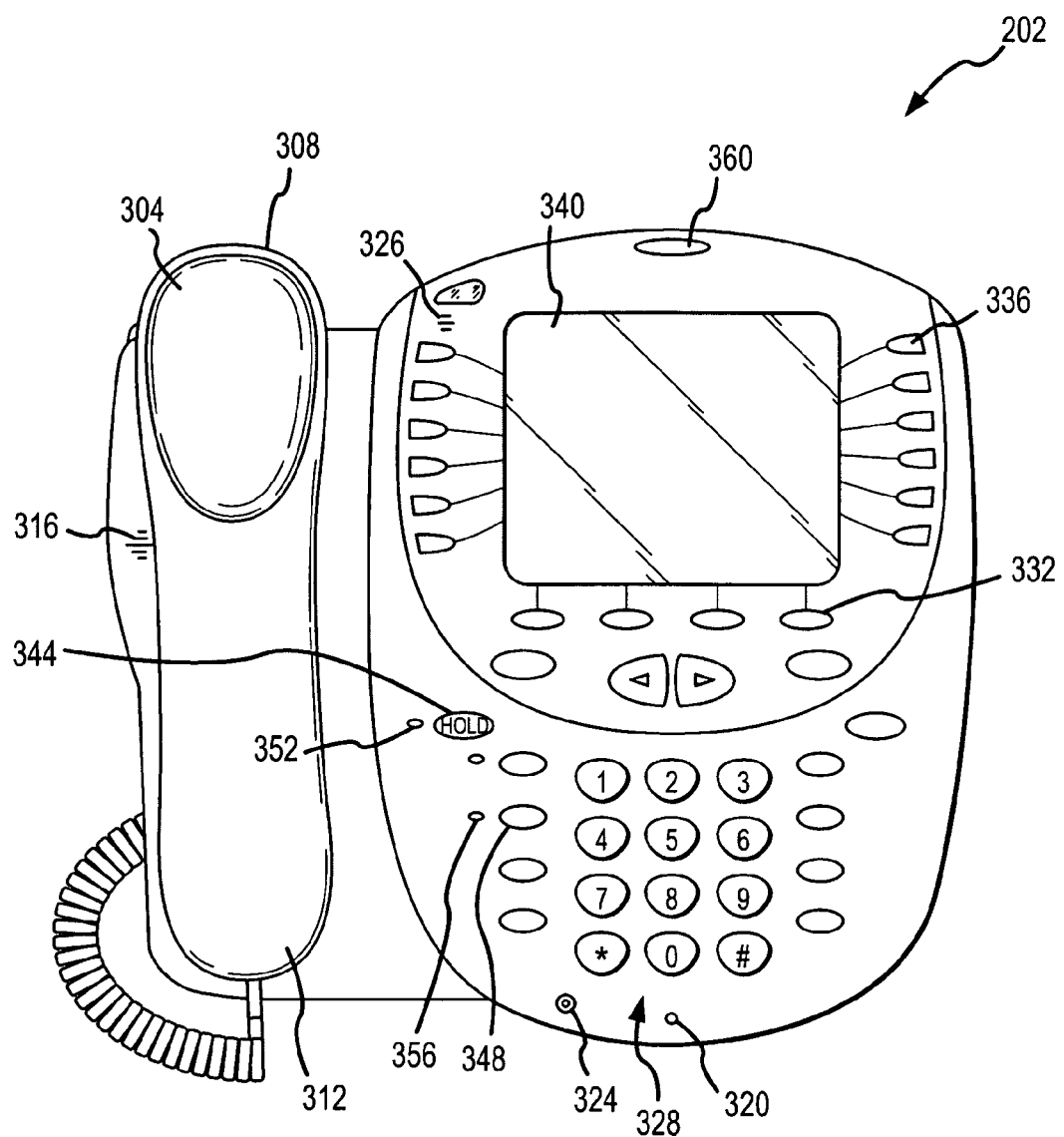
FIG. 3 depicts a telephony device in accordance with embodiments of the present invention.

With reference now to FIG. 2, a communication system 200 in accordance with embodiments of the present invention is illustrated. In general, the communication system 200 includes an enhanced communication endpoint 202 having an answer on hold notification feature as described herein and a number of communication endpoints 204a-b. A communication network 208 allows the various communication endpoints 202, 204 to be interconnected to one another. Accordingly, a communication network 208 provides a means for providing a communication channel between communication endpoints 202, 204. In accordance with embodiments of the present invention, a communication endpoint 202, 204 comprises any device capable of supporting real time communications. Accordingly, examples of communication endpoints 202, 204 or means for communicating include telephones, IP telephones, cellular telephones, and computer devices, such as personal computers or personal digital assistants (PDA) capable of providing telephony functions. Other particular examples of communication endpoints 202, 204 include customer relationship management (CRM) systems that may be associated with a number of customer service agent stations and that may incorporate or further be associated with interactive voice response (IVR) systems. The communication network 208 may comprise the public switched telephony network (PSTN), an Internet protocol (IP) network, or other wire line or wireless communication network. In addition, it should be appreciated that the communication network 208 may comprise a combination of a number of networks, including networks of different types. With reference now to FIG. 3, an enhanced communication endpoint 202 in accordance of embodiments of the present invention is illustrated. In particular, a communication endpoint 202 comprising a voice telephone is illustrated. The exemplary enhanced communication endpoint 202 generally includes a handset 304 that incorporates a speaker 308 and a microphone 312. In addition, a speaker 316 and a microphone 320 may be provided for hands-free (i.e. speaker phone operation). An enhanced communication endpoint 202 may additionally comprise a headset jack 324 for enabling hands-free operation in connection with the use of a headset. An answer on hold notification audio-transducer 326 may also be provided to signal to a user that a human voice or some other audible activity has been detected on a line that a user of the enhanced communication endpoint 202 has placed on hold.

The enhanced communication endpoint 202 may also provide a numeric keypad 328, soft keys 332 and line/feature buttons 336. In general, the soft keys 332 and line/feature buttons 336 are used in connection with application-specific features and can have variable functions, generally indicated by a label presented by a visual display 340. The enhanced communication endpoint 202 may also provide dedicated feature buttons, including a hold feature button 344, that allows another communication endpoint 204 to be placed on hold. As used herein, when a first enhanced communication endpoint 202 places a second communication endpoint 204a on hold, a communication channel or line comprising a call between the first enhanced communication endpoint 202 and the second communication endpoint 204a remains active, but the exchange of audio information between the communication endpoints 202 and 204a is at least partially disabled, to allow the user of the first enhanced communication endpoint 202 to handle another call through that communication endpoint 202. Accordingly, a hold feature comprises a means for disabling delivery of output to a user. Another dedicated feature button that may be provided in accordance with embodiments of the present invention is an answer on hold notification feature selection button 348, to activate an answer on hold notification feature as described herein. Furthermore, features may be made accessible to a user through soft keys 332 and/or line/feature buttons 336, as well as through the dedicated feature buttons.

The display 140, in an exemplary embodiment, comprises a liquid crystal or other type of visual display capable of presenting messages and information to a user. Such information may include information related to the status of the enhanced communication endpoint 202 and labels associated with the soft keys 332 and line/feature keys 336. In accordance with embodiments of the present invention in which the enhanced communication endpoint 202 comprises a video telephone, the display 340 may also operate to display images from one or more communications endpoints 204 with which the enhanced communication endpoint 202 is engaged in a video call.

The enhanced communication endpoint 202 may additionally include various visual indicators. Such indicators may include a hold feature selection light or lamp 352 that may light while a hold feature has been selected in order to place another communication endpoint 204 on hold. As can be appreciated by one of a skill in the art, a hold feature selection may also be indicated by a hold message displayed in the display 340. In addition, a hold feature selection lamp 352 or message in the display 340 may be associated with an indication of the line or lines that have been placed on hold by the user of the enhanced communication endpoint 202. An answer on hold notification feature lamp 356 may also be provided to indicate that an answer on hold notification feature as described herein has been selected. An answer on hold notification or signal lamp 360 may also be provided. The answer on hold signal lamp 360 may illuminate to notify the user of the enhanced communication endpoint 202 that there is activity, such as a human voice on a communication channel between the enhanced communication endpoint 202 and another communication endpoint 204 that has been placed on hold by the user of the enhanced communication endpoint 202. As used herein, a light or lamp is not limited to any particular technology for providing a visual output. Furthermore, a light or lamp may light steadily and/or may be pulsed or flashed. Accordingly, examples of lights or lamps include light emitting diodes (LEDs) and incandescent lamps.

Figure 4:
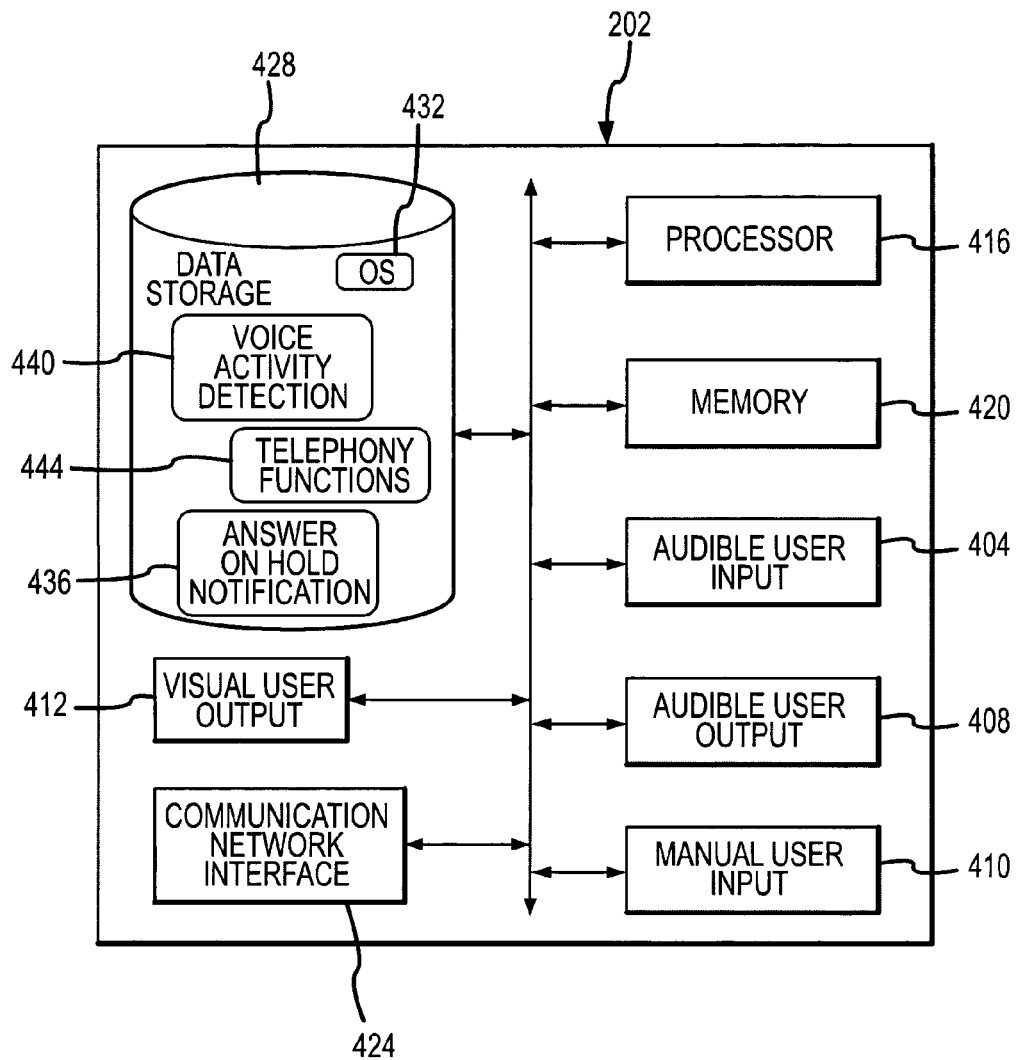
FIG. 4 is a block diagram depicting components of a telephony device in accordance with embodiments of the present invention.

With reference now to FIG. 4, components that may be included as part of an enhanced communication endpoint 202 are depicted in block diagram form. Such components may include one or more audible user inputs 404, such as the handset microphone 312, speaker phone microphone 120, or microphone provided as part of a headset. One or more audible user outputs 408 may also be provided. Examples of audible user outputs 208 include the handset speaker 308, speaker phone speaker 316, and a speaker provided as part of a headset. Additional examples of audible user outputs 408 include any additional audio transducers that may be provided, for example in connection with an audible ringer for indicating an incoming call, audible transducers for confirming feature selections, or in audio transducer 326 providing an audible answer on hold notification signal. As can be appreciated by one of skill in the art from the description provided herein, an audible user output 408 may provide more than one function. As an illustrative example, the speaker phone speaker 316 may, in addition to providing output comprising a voice signal from another endpoint 204, provide a ringer function to indicate an incoming call, and/or provide an audible output comprising an answer on hold notification. Accordingly, a dedicated answer on hold notification audio transducer 326 need not be included in order to provide an audible answer on hold notification signal to a user of an enhanced communication endpoint 202. One or more manual user inputs 410 may be included as part of the enhanced communication endpoint 202 for receiving input from a user. Examples of manual user inputs 410 include keys or buttons provided as part of a numeric keypad 328, as soft keys 332, as line/feature buttons 336, as a hold feature selection button 344, or as an answer on hold notification feature selection button 348. Furthermore, manual user input 410 may enable a user to perform various functions, such as activating or deactivating a hold feature by pressing a hold button 344 or another user input such as a soft key 332 or line/feature button 336 operating as a hold feature button. An enhanced communication endpoint 202 may also include one or more visual user outputs 412. Such visual user outputs 412 may include visual output provided by a display 340 and/or by indicator lamps such as lamp 352 and 360. Another example of a visual user output 412 is an answer on hold notification lamp 360. As can be appreciated by one in skill in the art from the description provided herein, a visual user output 412 may be used in connection with more than one function. For example, a visual answer on hold notification may be provided by a textual message provided by a display 340 or by flashing an indicator lamp (e.g. lamp 348) that is also used for another purpose. That is, a dedicated answer on hold notification lamp 360 need not be included in order to provide a visual answer on hold notification to a user.

A processor 416 may be provided to run programming code implementing various functions performed by the enhanced communication endpoint 202, including functions associated with providing an answer on hold notification to a user. In accordance with embodiments of the present invention, such functions may additionally include performing voice activity detection in connection with the answer on hold notification function. The processor 416 may include any general purpose programmable processor or controller for executing application or operating system programming or instructions. Alternatively, the processor 416 may comprise a specially-configured application specific integrated circuit (ASIC). Memory 420 may also be provided for use in connection with the execution of the programming by the processor 416, and for the temporary or long-term storage of data or program instructions. Memory 420 or may comprise solid state memory 420 may comprise solid state memory such as DRAM or SDRAM. Where the processor 416 comprises a controller, the memory 420 may be integral to the processor 416.

A communication network interface 424 interconnects the enhanced communication endpoint 202 to a communication network 208. For example, where the enhanced communication endpoint 202 comprises a conventional telephone, the communication network interface 424 may comprise a tip-ring interface. As another example, where the enhanced communication endpoint 202 comprises an IP telephone, implemented either as a standalone device or as a soft phone function provided in connection with a general purpose computer, the communication network interface 424 may comprise an Ethernet interface.

Data storage 428 may be provided for storing programming or data. For example, the data storage 428 may store operating system instructions 432. Applications that may be stored in data storage 428 include an answer on hold notification application 436, a voice activity detection application 440, and telephony function applications 444. The data storage 428 may comprise a magnetic storage device, a solid state storage device, an optical storage device, a logic circuit, or any combination of such devices. It should further be appreciated that the programs or data that may be maintained in the data storage 428 can comprise software, firmware or hardwired logic, depending on the characteristics of the data storage 428. In addition, various functions and applications may be integrated with one another and/or provided separately.

Figure 5:
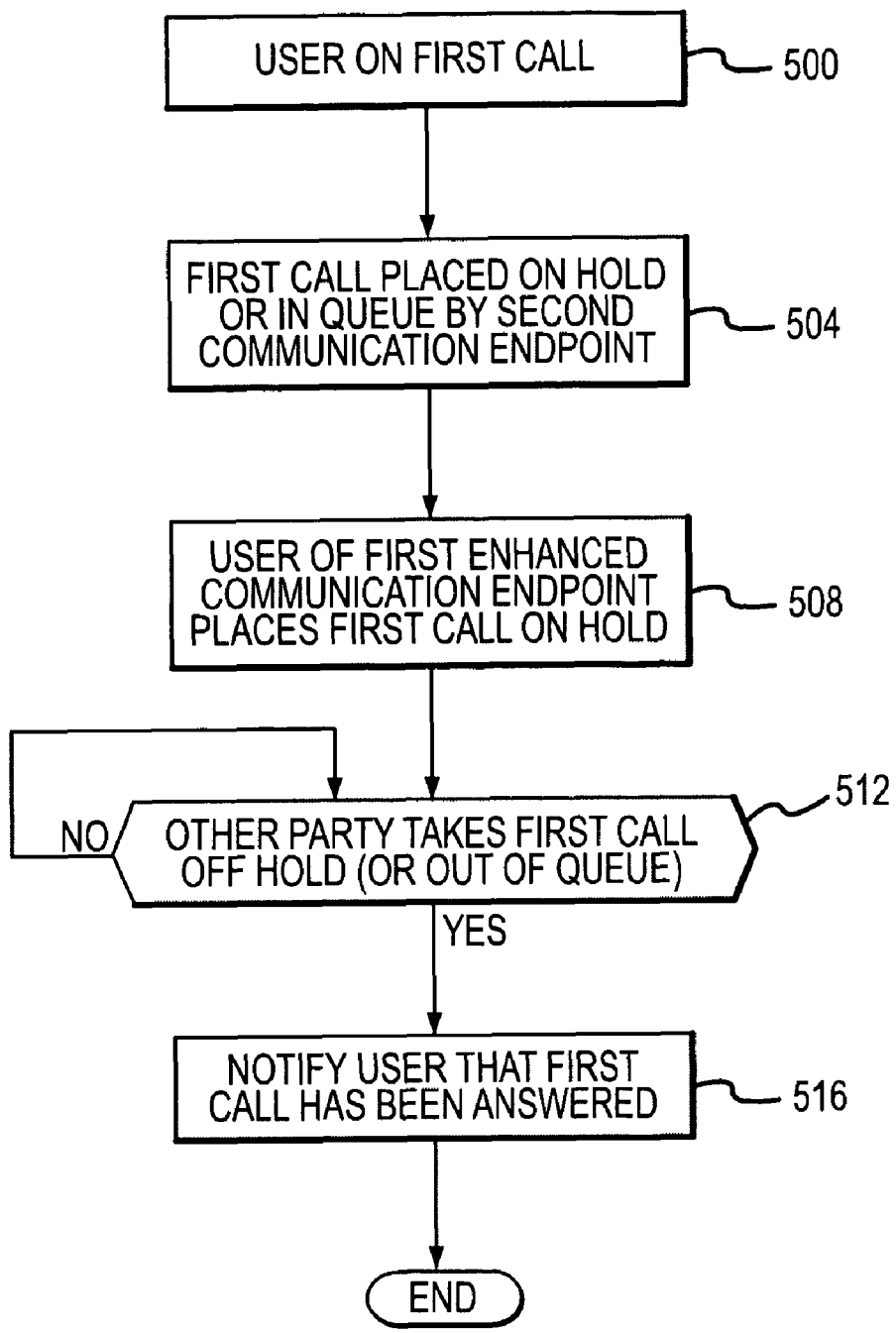
FIG. 5 is a flow chart illustrating aspects of the operation of an answer on hold notification feature in accordance with embodiments of the present invention.

With reference now to FIG. 5, aspects of the operation of an enhanced communication endpoint 202 capable of providing an answer on hold notification feature in accordance with embodiments of the present invention are illustrated. Initially, at step 500, a user of a first enhanced communication endpoint 202 is on a first call with a second communication endpoint, 204a. The first call between the first enhanced communication endpoint 202 and second communication endpoint 204a may comprise a first communication channel established over the communication network 208.

The first call is then placed on hold by the second communication endpoint 204a (step 504). As can be appreciated by one of skill in the art, placing the first call on hold by the second communication endpoint 204a may comprise providing the user of the first enhanced communication endpoint 202 with prerecorded announcements or music. Furthermore, the user of the first enhanced communication endpoint 202 may be placed on hold by the operation of a customer relationship management (CRM) or interactive voice response (IVR) system, without requiring action by a human at the second communication endpoint 204a. Accordingly, placing the first call on hold may comprise answering a call placed by the user of the first enhanced communication endpoint 202 and requiring that the user of the first communication endpoint 202 wait in a queue before they can receive a response from a live customer agent or other person associated with second communication endpoint 204a. Placing the first call on hold may also include a user of the second communication endpoint 204a activating a hold feature. In accordance with still other embodiments of the present invention, placing the first call on hold may include a user of the second communication endpoint 204a maintaining the connection with the enhanced communication endpoint 202 but without activating a hold feature or placing the first call in a queue. For example, placing the first call on hold may include a user at the second communication endpoint 204a placing the receiver down to do something else with the intent of returning to the call.

The user of the first enhanced communication endpoint 202 then places the first call on hold (step 508). A determination may then be made as to whether the other party (i.e. the second communication endpoint 204a) has taken the first call off hold, out of queue or whether an agent has otherwise joined the call (step 512). This determination can be made in various ways. For example, a signal indicating that an answer on hold notification signal should be generated may be provided to the first enhanced communication endpoint 202 by the second communication endpoint 204a when a live person has joined or is available for the first call. A signal from the second communication endpoint indicating that an answer on hold notification signal should be generated may be an in-band signal, for example, a particular dual tone multiple frequency (DTMF) tone or series of tones, or may be an out-of-band signal. Furthermore, such a signal may be generated manually or automatically by operation of the second communication endpoint 204*a*. As an example of manual generation, an agent associated with the second communication endpoint 204*a* may press a key or series of keys or voice a predetermined phrase to indicate that they have joined the first call. The action taken by the agent can be made in response to audible instructions played by the first enhanced communication endpoint 202 to the second communication endpoint 204*a* while the user of the enhanced communication endpoint 202 has an answer on hold notification feature selected or enabled. As an example of automatic generation, the second communication endpoint 204*a* may, in response to detecting that an agent has joined the first call, send an indicated tone or other signal without requiring separate action by the agent.

The determination as to whether an agent is available at the second communication endpoint 204*a* and has joined the call may also be made by detecting a voice signal on the first call from the second communication endpoint 204*a*. Such detection may be performed by the operation of a voice activity detection application 440 running on or in association with the enhanced communication endpoint 202. Such detection may also be performed by providing the user of the first enhanced communication endpoint 202 with the audio signal or a signal derived from the audio signal that is provided by the second communication endpoint 204*a*, to allow the user to determine whether the user should take the first call off of hold. In accordance with embodiments of the present invention, the audio signal can be provided to the user of the first enhanced communication endpoint 202 as an attenuated audible signal and as a signal that is not made available to any other communication device 204 with which the first enhanced communication endpoint 202 may be engaged in a second call. In accordance with other embodiments of the present invention, a signal derived from the audible signal, such as a level meter indicating the amount of sound energy detected from the second communication endpoint 204*a*, and/or a characterization of the type of audible signal being received from the second communication endpoint 204*a* may be provided. In response to determining that the call has been taken off hold or out of queue by the second communication endpoint 204*a*, the user of the first enhanced communication endpoint 202 is notified that the first call has been answered by an answer on hold notification signal (step 516). If it is determined at step 512 that the party at the second communication endpoint 204*a* has not taken the first call off hold, the process may idle at step 512 until the call is answered or until the call is terminated.

Notification to the user of the first enhanced communication endpoint 202 that the first call has been answered by a human agent or otherwise requires a response can be provided in various ways. For instance, a message may be displayed in the display 340 of the first enhanced communication endpoint 202. Further, such a message may include an indication of the type of signal detected on the first call as being received from the second communication device 204*a*. As an alternative or in addition, an answer on hold notification lamp 356 may be illuminated. In addition or as an alternative to such visual indicators, an audible signal may be provided to the user of the first enhanced communication endpoint 202, to indicate that a human agent or other person is available at the second communication endpoint 204*a*. Such an audible communication may be provided through an audible user output 308, such as the handset speaker 308, speaker phone speaker 316, a speaker provided as part of a headset, or through an audio answer on hold notification device 326. Accordingly, a means for notifying a user that output is available to a user on a call that the user placed on hold may provide visual and/or audible output to its user.

In accordance with embodiments of the present invention, notification that the first call has been answered at the second communication endpoint 204*a* may be provided in the form of a self-initiated whisper page. According to such embodiments, the user of the first enhanced communication endpoint 202 is provided with an audio feed from the first call, while the first enhanced communication endpoint 202 is engaged in a second call with a third communication endpoint 204*b*. This feature is different from a conference call feature, in that the audio feed from the second communication endpoint 204*a* is not provided to the third communication endpoint 204*b*. In accordance with further embodiments of the present invention, the audio feed from the first call may be provided to the user of the first enhanced communication endpoint 202 as an attenuated audio stream, or as a single channel of a stereo audible user output 408. Accordingly, such embodiments allow the user of the first enhanced communication device 202 to monitor audible information provided from the second communication endpoint 204*a* while the user of the first enhanced communication endpoint 202 is engaged in a second call, to determine when the first call has been answered by a human agent or otherwise requires input from the user of the first enhanced communication endpoint 202.

In accordance with further embodiments of the present invention, a level meter may be provided as part of the first enhanced communication endpoint 202. The level meter may provide a visual indication of the amplitude of an audible signal from the second communication endpoint 204*a*. According to such embodiments, a spike or other change in the level of the audio input may be taken as an indication that a human agent may have answered the first call, and may therefore serve as a prompt or notification to the user of the first enhanced communication endpoint 202 to check on the status of the first call, or the level may be used to trigger a notification signal if it exceeds a predetermined amount. A level meter may also be presented using any audible user output 412 associated with the enhanced communication endpoint 202.

In accordance with still other embodiments of the present invention, the first enhanced communication endpoint 202 may provide a message that a human agent joining the first call at the second communication endpoint 204*a* should hit a digit, thereby producing a DTMF tone, to gain the attention of the user of the first enhanced communication endpoint 202. Such a message may be an audible message that is generated continuously, or that is provided in response to the detection of a live voice or other indication that a human agent has joined the first call at the second communication endpoint 204*a*, while the answer on hold notification feature is selected or enabled. Upon receiving the indicated signal at the first enhanced communication endpoint 202, the first enhanced communication endpoint 202 may generate a notification signal that is provided to the user of the first enhanced communication endpoint 202.

As part of a signal notifying the user of a first enhanced communication endpoint 202 that a first call has been answered, an indication of the type of sound being heard on the first call may be provided on the display screen 340 of the enhanced communication endpoint 202. For example, letters indicating the type of sound may be scrolled across the display screen 340. As an illustrative example, "S" may indicate silence, "M" may indicate music, "V" may indicate voice, "D" may indicate dial tone, "R" may indicate ring-back, and digits, star or pound may indicate DTMF tones. Accordingly, such embodiments allow the user of an enhanced communication endpoint 202 to visually monitor the status of a first call while that call is on hold.

Although certain examples provided herein have discussed providing notification that a first call that has been placed on hold by a user of a first enhanced communication endpoint 202 has been answered while the user of the enhanced communication endpoint 202 is on a second call, embodiments of the present invention may also be used in a single call scenario. For example, rather than having to monitor a call manually, the user may place the call on hold. When the call has been answered, an answer on hold notification signal is provided to the user.

Figure 6:
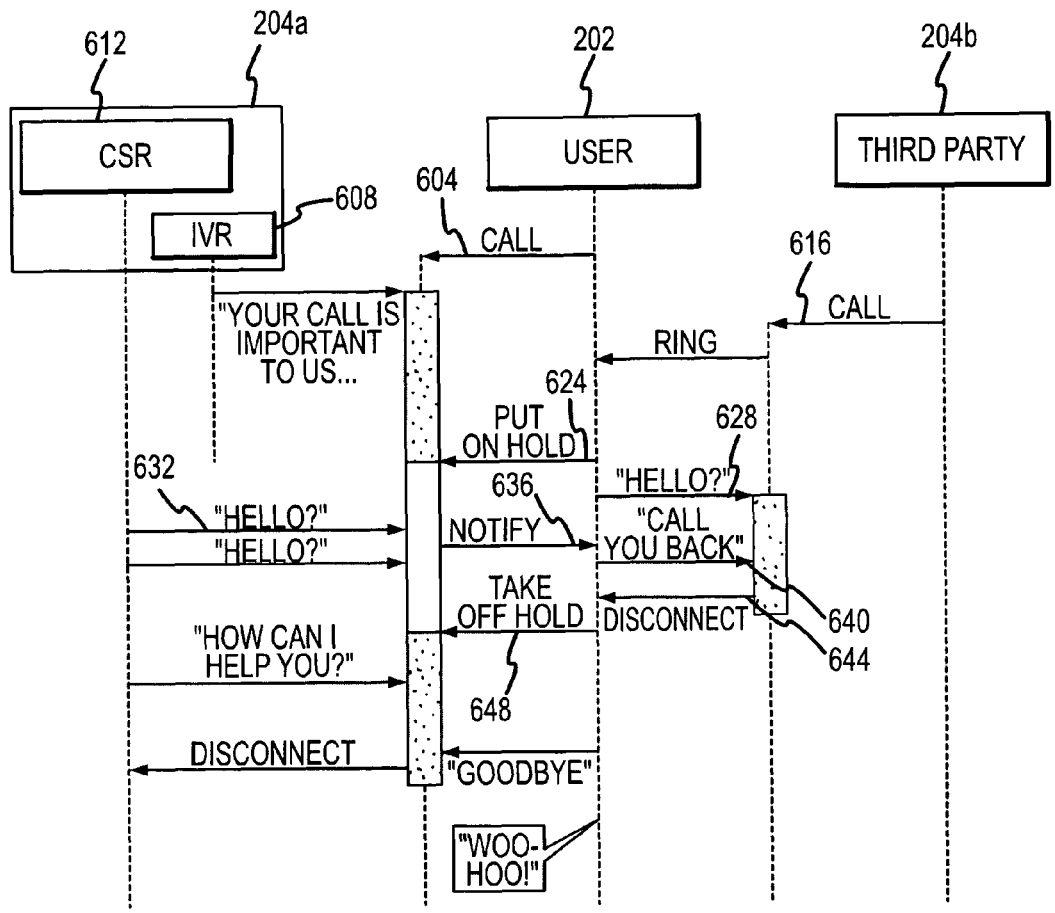
FIG. 6 depicts a scenario in which an answer on hold notification is provided in accordance of embodiments of the present invention.

With reference now to FIG. 6, an example scenario of the use of an answer on hold notification feature in accordance with embodiments of the present invention is provided. Initially, the user of the first enhanced communication endpoint 202 places a call 604 that is directed to a second communication endpoint 204a. As shown in FIG. 6, the second communication endpoint 204a may comprise an interactive voice response system 608 and a customer service representative (CSR) communication device 612. The call 604 from the first enhanced communication endpoint 202 is answered by the interactive voice response (IVR) system 608 of the second communication endpoint 204a. The response from the IVR system 608 indicates that the user of the first enhanced communication endpoint 202 will need to wait for a live customer service representative. After the first call 604 has been answered by the second communication endpoint 204a, the first enhanced communication endpoint 202 receives a second call 616 from a third communication endpoint 204b. After receiving an indication of the incoming second call 616, the user of the first enhanced communication endpoint 202 places the first call 604 on hold 624, and answers the second call 628. After the user of the first enhanced communication endpoint 202 has answered the second call 628, a customer service representative at the second communication endpoint 204a answers the first call 632. The answer on hold notification feature then operates to generate a notification signal 636 indicating that a customer service representative is available to service the first call 604. In response to the notification signal 636, the user of the first enhanced communication endpoint 202 may wrap up and disconnect from the second call 644 or suspend the second call 640 by placing the second call on hold. The user of the first enhanced communication endpoint 202 may then take the first call off hold 648 and engage in live communication with the customer service representative at the second communication endpoint 204a.

Although certain examples included in the description have described scenarios including a first enhanced communication endpoint 202 in connection with conventional second and/or third communication endpoints 204, it should be appreciated that such second and third communication endpoints may comprise additional enhanced communication endpoints 202 (i.e. communication endpoints having an answer on hold notification feature). Furthermore, it should be appreciated that an answer on hold notification feature may be incorporated into an enhanced communication endpoint that is associated with CRM and/or IVR features or systems.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for notifying a user of a communication device of an active communication on a deselected communication channel:
   establishing a first communication channel between a first communication endpoint comprising said communication device and a second communication endpoint;
   after said establishing said first communication channel, said first communication endpoint placing said second communication endpoint on hold;
   after said establishing said first communication channel and after said first communication endpoint placing said second communication endpoint on hold, establishing a second communication channel between said first communication endpoint and a third communication endpoint;
   after said establishing a second communication channel, receiving a signal from the second communication endpoint, wherein the signal is a human voice;
   in response to receiving the signal from the second communication endpoint, providing a notification signal at said first communication endpoint that said second communication endpoint requires a response from said first communication endpoint, wherein said notification signal provided at said first communication endpoint includes indicating a type of signal being received is a human voice.

2. The method of claim 1, wherein said second communication channel is selected as an active communication channel.

3. The method of claim 1, further comprising:
   after said providing notification signal at said first endpoint that said second communication endpoint requires a response from said first endpoint, said first communication endpoint taking said second communication endpoint off hold.

4. The method of claim 3, further comprising:
   selecting said first communication channel as said primary communication channel and deselecting said second communication channel as said primary communication channel.

5. The method of claim 1, further comprising:
   detecting a human voice on said first communication channel while said second communication endpoint is on hold, wherein said notification signal is provided in response to said detecting a human voice.

6. The method of claim 1, further comprising:
   receiving a signal on said first communication channel indicating that said second communication endpoint requires a response from said first endpoint, wherein said notification signal is provided in response to said receiving a signal.

7. The method of claim 1, further comprising:
   before said first communication endpoint places said second communication endpoint on hold, said second communication endpoint places said first communication endpoint on hold.

8. The method of claim 1, wherein said notification signal includes providing said user with an audio feed from said first communication channel, wherein said user may apprehend an audible communication indicating that a response from said user is required on said first communication channel.

9. The method of claim 1, wherein said first communication endpoint placing said second communication endpoint on hold comprises a user of said first communication endpoint activating a feature provided through said first communication endpoint to place said second communication endpoint on hold.

10. The method of claim 1, wherein said notification signal is not triggered by hold music delivered by said first communication endpoint while said second communication endpoint is on hold.

11. A system for providing answer on hold notification, comprising:
 a communication network;
 a second communication endpoint in communication with the communication network;
 a third communication endpoint in communication with the communication network;
 a first enhanced communication endpoint in communication with the second communication endpoint and the third communication endpoint through the communication network, the first enhanced communication endpoint including:
  a communication network interface;
  a user output;
  a user input;
  a controller, wherein said first enhanced communication endpoint provides a hold feature, wherein the controller is operable to:
   place the communication between the first enhanced communication endpoint and the second communication endpoint on hold;
   activate the hold feature;
   conduct the communication between the first enhanced communication endpoint and the third communication endpoint;
  the hold feature operable to determine there is activity requiring a user response with respect to the communication with the second communication endpoint, wherein the activity is a voice signal received from the third communication endpoint;
  the hold feature operable to provide a notification signal to a user notifying the user of the activity requiring the user response wherein the notification providing an indication that a type of signal being received is a human voice, and wherein the hold feature is operable to provide the notification signal while the communication between the first enhanced communication endpoint and the third communication endpoint is active.

12. The system of claim 11, wherein said user output further includes an audible output, and wherein said notification signal is further provided by said audible output.

13. The system of claim 11, wherein said notification signal is provided in response to a signal from a voice activity detector indicating that a human voice is detected with respect to said communication for which said hold feature has been activated.

14. The system of claim 11, wherein said notification signal is provided in response to a signal from said second communication endpoint.

15. The system of claim 11, wherein said second communication endpoint comprises part of a customer response management system.

16. A system for indicating that user input on a communication channel is required, comprising:
 a communication endpoint, the first communication endpoint comprising:
  a memory operable to store computer executable instructions;
  a processor in communication with the memory; the processor is operable to read the computer executable instructions from the memory and operable to execute the computer executable instructions, the instructions comprising:
   instructions to receive a communication from a second communication endpoint;
   instructions to place the communication on hold;
   instructions to determine that the second communication endpoint has actively placed the communication on hold;
   instructions to determine that a hold feature has been activated by the second communication endpoint;
   instructions to determine that a voice signal from a human agent to a user of the communication endpoint has been received, wherein the voice signal is an audible communication from the communication endpoint;
   instructions to send a signal to the second communication endpoint that the human agent is available and the communication with the communication endpoint should be taken off hold;
   wherein the signal notifies the user of the second communication endpoint that a type of signal being received is a human voice and that said human agent is available to said user, wherein the second communication endpoint is operable to provide a notification signal in the form of an attenuated first output while the second communication endpoint has established a second communication with a third communication endpoint,
   wherein the notification signal is operable while the user of the second communication endpoint is exchanging at least audible information with a second user of the third communication endpoint, and
   wherein the second user of the third communication endpoint is not provided with the notification signal.

* * * * *